United States Patent [19]

Meneses

[11] Patent Number: 5,588,460
[45] Date of Patent: Dec. 31, 1996

[54] FIRE HYDRANT VALVE GUIDE WITH LOCKING SLEEVE AND WRENCH THEREFOR

[76] Inventor: Aaron B. Meneses, 32527 Jacklynn Dr., Union City, Calif. 94587

[21] Appl. No.: 506,425

[22] Filed: Jul. 24, 1995

[51] Int. Cl.$^6$ .............................. F16K 35/10; E03B 9/06
[52] U.S. Cl. .......... 137/296; 81/121.1; 81/124.4; 81/125.1; 137/382.5; 137/797; 137/800; 138/96 T; 220/284; 251/291
[58] Field of Search .................. 137/294, 296, 137/377, 382, 382.5, 797, 800, 67, 68.11, 68.14; 138/89, 96 T; 81/121.1, 124.3, 124.4, 124.7, 125.1, 177.85, 436; 220/284; 251/291, 292

[56] References Cited

U.S. PATENT DOCUMENTS

| | | |
|---|---|---|
| 174,486 | 3/1876 | Collingsworth .................. 81/125.1 |
| 2,576,631 | 11/1951 | Mueller et al. .................. 137/296 |
| 2,762,386 | 9/1956 | Fogle .................. 137/296 |
| 3,586,019 | 6/1971 | Thomas et al. .................. 137/296 |
| 3,902,519 | 9/1975 | Polkey .................. 137/272 |
| 4,356,839 | 11/1982 | Voynovich .................. 137/296 |
| 4,369,807 | 1/1983 | Camp .................. 137/296 |
| 4,484,595 | 11/1984 | Vanek et al. .................. 137/296 |
| 4,633,896 | 1/1987 | Bainbridge et al. .................. 137/296 |
| 4,651,771 | 3/1987 | Borenstein et al. .................. 137/296 |
| 4,936,336 | 6/1990 | McCauley et al. .................. 137/296 |

*Primary Examiner*—George L. Walton
*Attorney, Agent, or Firm*—Linval B. Castle

[57] ABSTRACT

A hydrant protector for preventing unauthorized use of the hydrant includes an internally threaded tubular shield around the valve stem. To prevent a collection of trash in the shield and to provide more security for the hydrant a threaded plug fits completely into the shield and against the end of the valve stem and has, in the flat exterior end, a pentagonal keyway of deep grooves. A wrench having a pentagonal tubular socket to fit the keyway will also fit the valve stem.

5 Claims, 2 Drawing Sheets

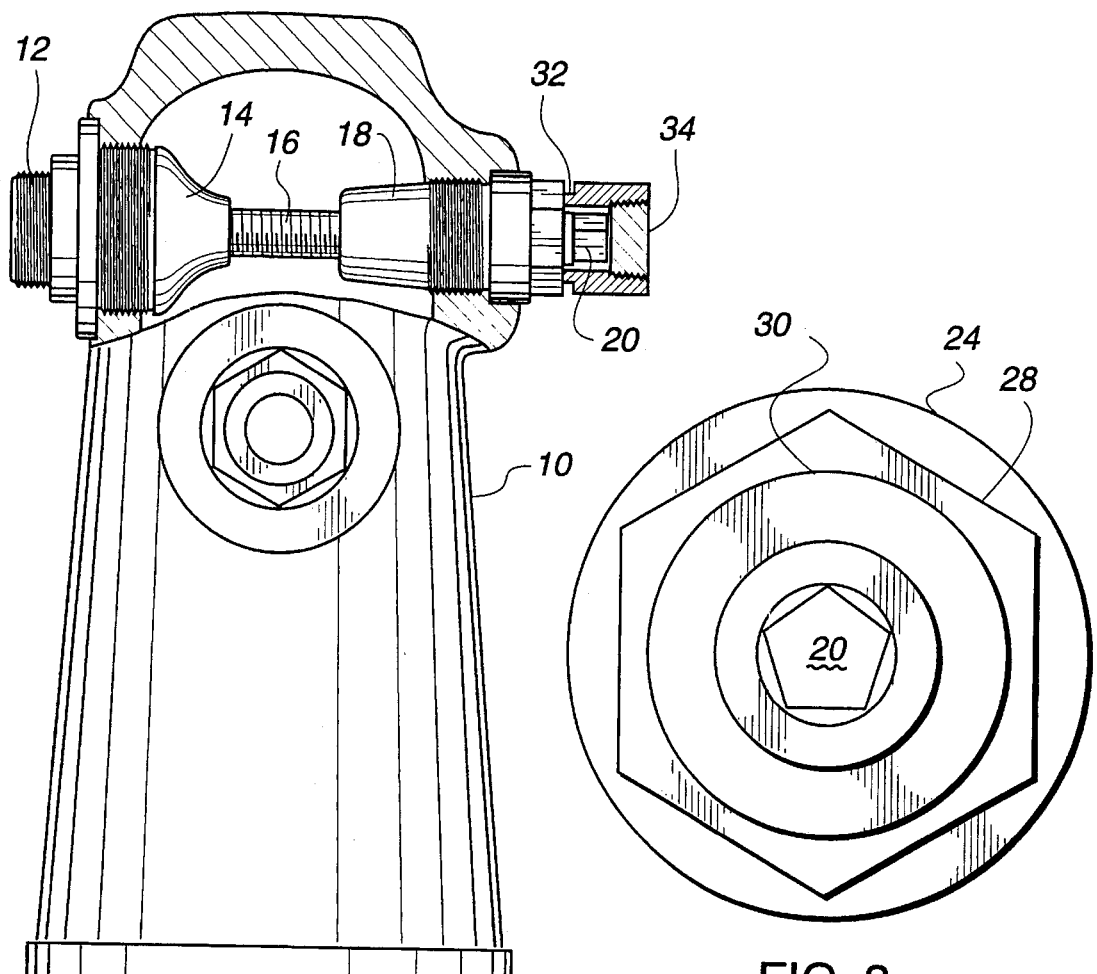
FIG. 1
FIG. 3
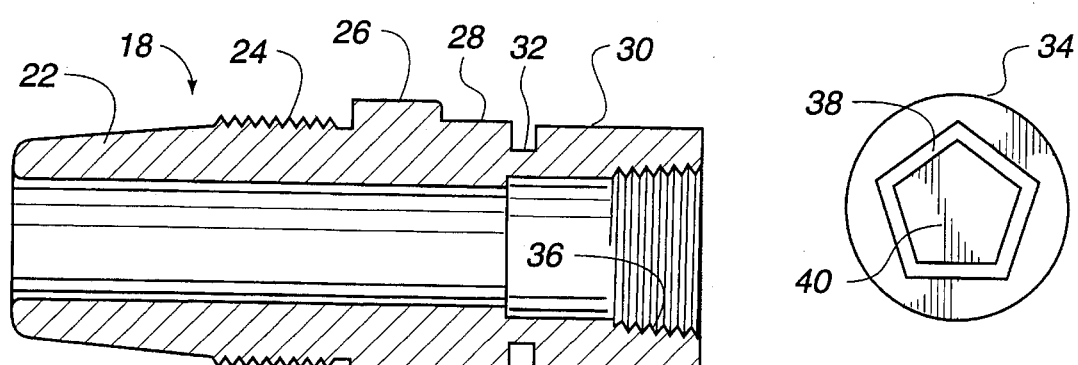
FIG. 2
FIG. 4

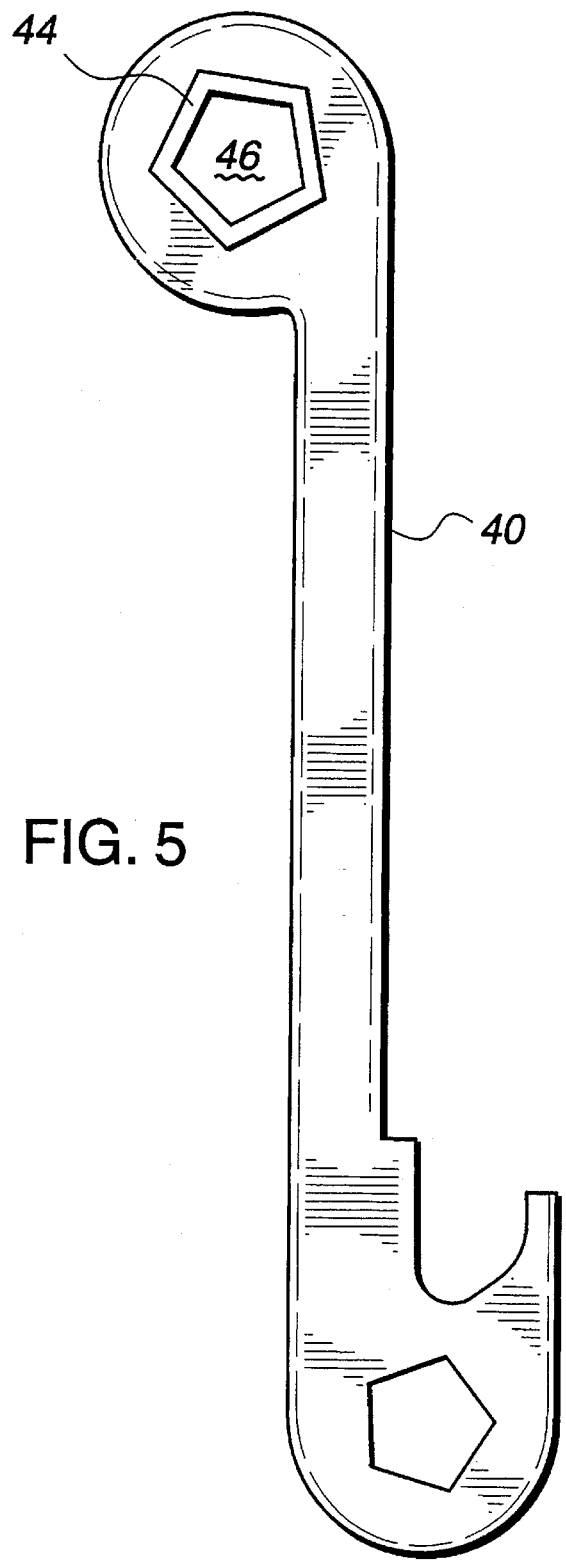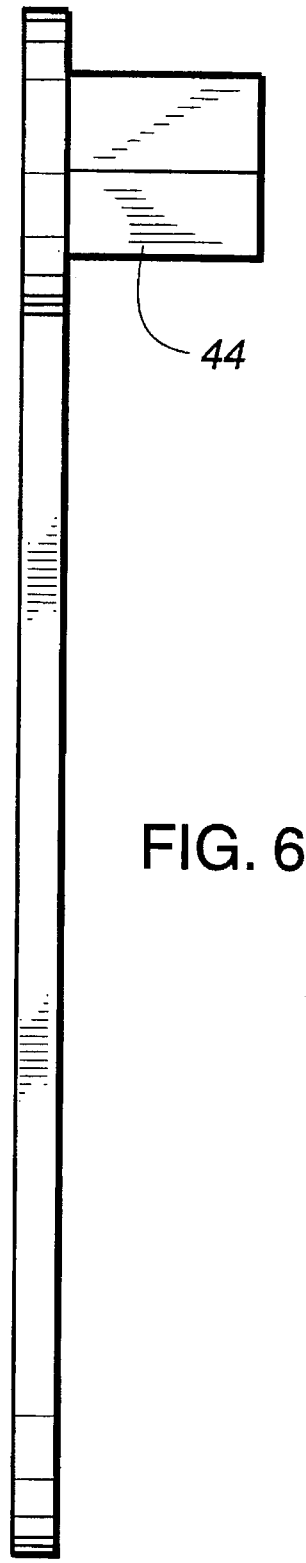
FIG. 5
FIG. 6

000
FIRE HYDRANT VALVE GUIDE WITH LOCKING SLEEVE AND WRENCH THEREFOR

This invention relates to fire hydrants and particularly to a locking sleeve for preventing the unauthorized opening of the hydrant valve.

BRIEF SUMMARY OF THE INVENTION

Most conventional fire hydrants have two of three horizontally positioned fire hose connectors, each being controllable by a valve stem extending from the hydrant diametrically opposite its hose connector. Each hose connector is provided with a screw cap or cover having an axial stud on it that may be turned by a special wrench that also fits the valve stem. This wrench has a pentagonal shaped socket made to fit the pentagonal stud and the pentagonal valve stem. the designs for which were adopted so that they couldn't be opened by the general public with a conventional wrench with parallel jaws.

But the general public had pipe wrenches that can open an irregular shaped valve stud, and on hot summer days when paved streets are sweltering, people will open the hydrant valves and flood the streets in an attempt to cool themselves.

When this occurs, thousands of gallons of water may be lost and may seriously reduce a city water supply before it is discovered and shut off. Just as serious is the damage to the hydrant. The use of sharp pipe wrench jaws on the edges of the pentagonal valve stem very quickly wears over these edges so that the valve stem no longer can fit the special wrenches carried by firefighters. The only solution is to shut down the fire hydrant and to replace the valve stem. This temporarily removes the hydrant from service and could be damaging in case of emergency. Furthermore, the maintenance on the hydrant and the need for carrying a supply of spare hydrant valve parts is costly.

Some municipalities have had problems with vandals who disassemble a hydrant to sell the brass from them. As a result of this and the damage from the unauthorized operation of the hydrant, many patents have been obtained for protective devices that will prevent, or at least discourage a prospective vandal. Most of these patents are concerned with protecting the vertical valve stem hydrants having the valve below street level and the pentagonal stem extending from the top of the hydrant. Positioning a cup on top or in the side of the hydrant to shield the valve stem such as shown in U.S. Pat. No. 4,369,807 or 3,453,655 results in the shielding cup being filled with trash and scrap paper. This was recognized in U.S. Pat. No. 4,566,481 which shows a dome free to swivel on the end of the pentagonal stem with a very narrow space at the base of the dome for a very thin special wrench to engage the pentagonal stem. Without that thin wrench, the hydrant is useless.

This invention is for an improved valve stem guide or carrier of conventional design for the interior of a hydrant but having, formed on the exterior, a tubular extension shielding the pentagonal valve stem. The tubular extension is internally threaded to receive a plug which has, in its exposed end, a deeply grooved pentagonal keyway about a quarter inch larger than the cross section of the pentagonal valve stem. The special wrench for use with the valve stem guide has an extended pentagonal socket for reaching into the tubular extension to engage the pentagonal valve stem. The exterior of the wrench's socket is also pentagonal for engaging the deeply grooved keyway of the plug. The tubular extension can be broken from the valve stem guide in an emergency if the firefighters do not have the special wrench.

DESCRIPTION OF THE DRAWINGS

In the drawings which illustrate the preferred embodiment of the invention:

FIG. 1 illustrates a fire hydrant, partly in section, showing one valve, the valve stem, and the valve stem guide with locking sleeve;

FIG. 2 is an enlarged sectional view of the valve stem guide;

FIG. 3 is an end view of the valve stem guide without a plug;

FIG. 4 is an end view of the plug with grooved keyway;

FIG. 5 illustrates the special wrench for the grooved keyway and the pentagonal stem; and FIG. 6 is a side view of the special wrench.

DETAILED DESCRIPTION OF THE PREFERRED EMBODIMENT

FIG. 1 illustrates a modern Model M-64 fire hydrant 10 with the upper section cut away to show the interior and one of the two hose nozzles 12, its valve 14, its valve stem carrier 16 and valve stem guide 18 which is located diametrically opposite the nozzle on the hydrant. Emanating from the center of the stem guide 18 is a valve stem 20 having a pentagonal cross section which requires a special wrench possessed only by firefighters. All of these components are of conventional design except the stem guide 18 which has been modified as described herein.

As previously discussed, unauthorized personnel quite regularly open the valves on fire hydrants with pipe wrenches on very hot days to flood the streets, resulting in lowered water pressure, danger to the water supply, and permanent damage to the pentagonal valve stem of the hydrant. To prevent his unauthorized used of the hydrant, I have shielded the pentagonal valve stem 20 with a tubular outer shield that extends beyond the end of the stem so that a pipe wrench cannot reach the stem.

FIG. 2 is a sectional view illustrating the preferred embodiment of the valve stem guide 18. This stem guide 18 is most often formed of brass or bronze to resist rust and is comprised of an interior tapered section 22 about three inches long which guides the stem within the hydrant, followed by one inch of threaded section 24 which attaches the stem guide 18 to the hydrant. Next to the threaded section is a 3 ½ inch diameter flange 26, followed by a 3 inch hexagonal nut 28 by which the entire stem guide 18 is screwed into the hydrant. The valve guide 18, as far as explained, is not new and has been made for several years.

In the preferred embodiment of the invention, the valve guide 18 is made with an attached coaxial tubular shield 30 which extends approximately one inch past the end of the end of the valve stem 20 as shown in FIG. 1. The shield 30 may be welded or brazed onto the hexagonal nut but is preferably a part of the the valve stem guide 18 and is attached to the hexagonal nut 28 at a thin section 32 which may be broken, in an emergency, by several hard blows from the firefighter's axe in case the firefighter does not have the required special wrench.

Tubular shields of this type have been used in the past and always seem to be a gathering place for paper cups, used chewing gum and assorted trash. Therefore, to prevent such dumping which would hinder access into the valve stem and to further protect the valve stem, the preferred embodiment of the invention includes an externally threaded plug 34 which is threaded into internal threads 36 in the bore of the shield 30. An additional advantage of having a plug in the shield is that the plug reinforces the shield and prevents it from becoming deformed or badly bent if attempts are made to break off the shield. The plug can be easily removed but only be removed with the special wrench to be described.

FIG. 3 is an end view of the valve stem guide 18 without a threaded plug and shows the flange 26 and the hexagonal nut 28 with the tubular shield 30 attached. Within the shield 30 is shown the end of the pentagonal valve stem 20 which requires a pentagonal wrench always carried by firefighters.

Illustrated in FIG. 4 is the cylindrical shaped threaded plug 34 which is screwed into the threaded bore of the shield 30. As shown in FIG. 1, the plug 34 is screwed into the shield so that the plug exterior surface is either flush with, or recessed into the flat end surface of the shield 30 so that it cannot be removed with a pipe wrench by unauthorized personnel. In the flat exterior surface illustrated is a pentagonal groove about a quarter inch wide and deep that provides a keyway 38 to be engaged by a firefighters wrench. The center 40 of the plug within the keyway has substantially the same dimensions as the cross section of the valve stem 20.

FIGS. 5 and 6 illustrate the special wrench 42 having at one end a pentagonal shaped male socket 44 formed by the outer surface of a 3/16 inch thick steel tubing on the surface of one side of the wrench and a female socket 46 formed by the inner surface of the tubing and opening through the wrench. The male socket fits into the keyway 38 in the threaded plug and the female socket 44 engages the valve stem 20. The steel socket tubing must therefore be sufficiently long to reach into the shield 30 to engage the stem 20. The hook shape at the opposite end of the wrench 40 is designed to engage the radial studs on a fire hose coupling.

I claim:

1. A fire hydrant protector against unauthorized use comprising:

a fire hydrant having a valve means with a valve carrier portion and a valve stem, a valve stem guide, said valve stem guide having a pair of open ends with an intermediate threaded portion disposed therebetween, said valve stem guide threaded portion is threadably secured within a threaded fire hydrant opening, with one of said open ends being disposed within said fire hydrant and said other open end extending exteriorly of said fire hydrant, said valve stem guide is removably guided along said valve carrier portion through said open ends, said valve stem having an exposed portion extending coaxally and into one of said ends when said valve means is threadably secured within said fire hydrant opening valve stem guide including screw means for screwing said stem guide into the hydrant, the valve stem coaxially extending from said screw means;

a tubular shield concentrically attached at said exterior open end adjacent said screw means said shield being coaxial with said valve stem and having a length longer than the extension of said valve stem from said valve stem guide, said shield having an interior threaded portion located at said exterior open end;

a threaded plug removably adapted to fit completely within wherein said plug reinforces said shield and prevents said shield from becoming deformed and badly bent, if attempts are made to break said shield of said shield wherein said plug reinforces said shield and prevents said shield from becoming deformed and badly bent, if attempts are made to break said shield, said plug having a deeply grooved pentagonal keyway in its flat outer surface, said plug and said valve stem being rotatable by a single special wrench having an elongated male socket for removably securing said plug within said interior threaded portion and a female pentagonal socket for rotating said valve stem to open and close said valve means, while preventing unauthorized use.

2. The fire hydrant protector claimed in claim 1 wherein said plug fits completely within said tubular shield so that a pipe wrench cannot grasp the tubular walls of said plug.

3. The fire hydrant protector claimed in claim 2 wherein said tubular shield is a component part of said valve stem guide, said tubular shield being separated from said screw means by a narrow section of reduced diameter material to provide an emergency fracture ring.

4. The fire hydrant protector claimed in claim 2 wherein said tubular shield is welded to said valve stem guide.

5. The fire hydrant protector claimed in claim 1 wherein said deeply grooved pentagonal keyway in said threaded plug are grooves approximately one quarter inch deep and one quarter inch wide, the interior of said keyway being the same dimensions as the cross section of the valve stem.

\* \* \* \* \*